United States Patent [19]

Long

[11] Patent Number: 4,501,771
[45] Date of Patent: Feb. 26, 1985

[54] ELASTOMER-COATED BIAS REINFORCEMENT FABRIC AND METHOD FOR PRODUCING SAME

[75] Inventor: Delmar D. Long, Rock Hill, S.C.

[73] Assignee: Dayco Corporation, Dayton, Ohio

[21] Appl. No.: 350,969

[22] Filed: Feb. 22, 1982

[51] Int. Cl.³ .............................................. B05D 3/12
[52] U.S. Cl. .................................... 427/176; 427/209;
427/322; 427/381; 428/245; 428/257; 428/109; 474/268
[58] Field of Search ............... 427/211, 209, 176, 322, 427/381, 412.5; 118/244, 246, 255, 419, 420; 474/268; 428/245, 257, 109

[56] References Cited

U.S. PATENT DOCUMENTS

| | | |
|---|---|---|
| 1,323,212 | 11/1919 | Bulley . |
| 3,784,427 | 1/1974 | Griffin .................................. 156/139 |
| 3,832,210 | 8/1974 | Rohlfing .................................. 117/4 |
| 4,062,989 | 12/1977 | Long .................................. 427/176 |
| 4,116,159 | 9/1978 | Long .................................. 118/34 |
| 4,205,559 | 6/1980 | Long et al. ............................. 74/233 |
| 4,283,455 | 8/1981 | McGee .................................. 428/240 |

Primary Examiner—James J. Bell
Attorney, Agent, or Firm—Joseph V. Tassone

[57] ABSTRACT

An elastomer coated bias fabric for reinforcing power transmission belts and the like is disclosed wherein one face of the fabric is provided with an uncured, tacky, carboxylated elastomeric composition. In one embodiment, the fabric is prepared by pre-impregnating the fabric with a neoprene latex composition followed by coating the neoprene composition on both faces of the fabric, and after drying the fabric, overcoating one face only of the coated fabric with a tackified, carboxylated neoprene latex composition. A method and apparatus for manufacturing the coated fabric is also disclosed.

13 Claims, 4 Drawing Figures

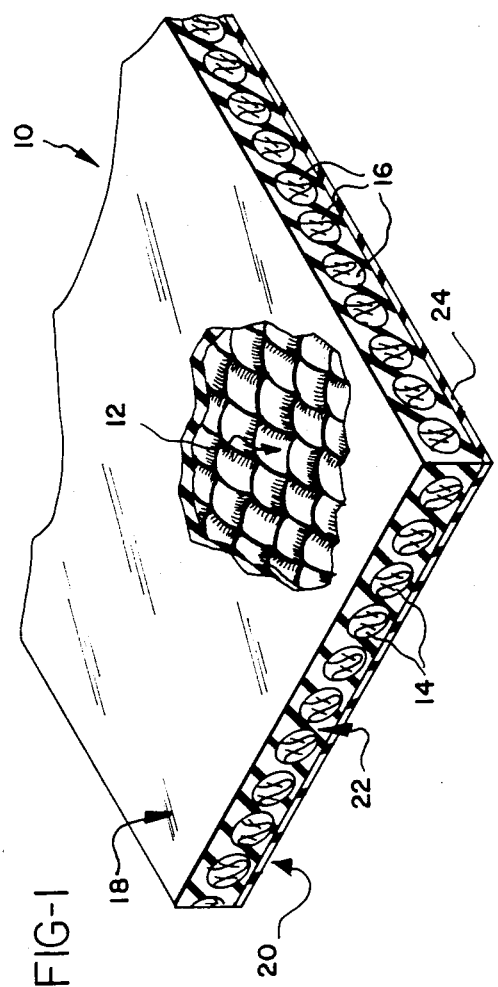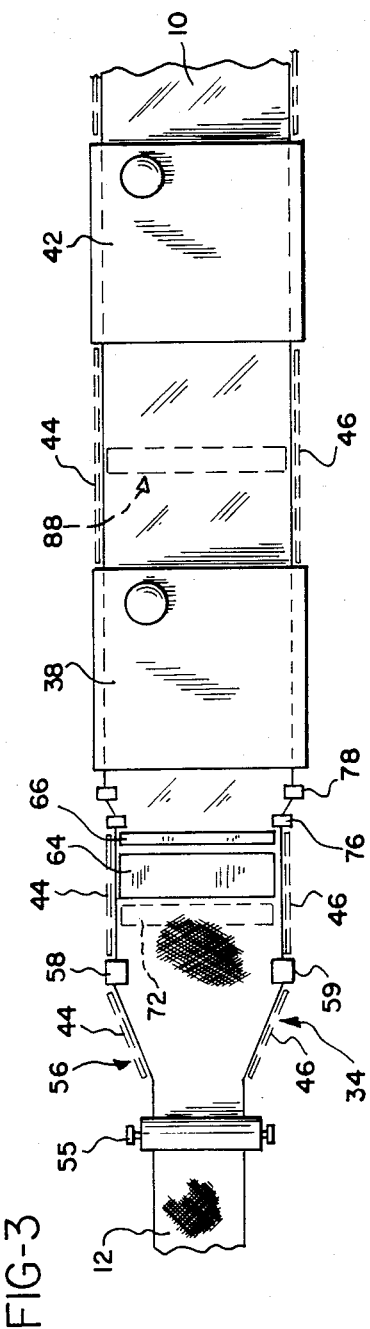

ELASTOMER-COATED BIAS REINFORCEMENT FABRIC AND METHOD FOR PRODUCING SAME

BACKGROUND OF THE INVENTION

1. Field of the Invention

The present invention relates to elastomer-coated bias fabrics of the type employed as reinforcement in such industrial products as power transmission belts, hoses, tires and the like and, more particularly, to neoprene-coated bias-cut reinforcement fabrics having one tacky face; and to a method and apparatus for producing the same.

2. Prior Art Statement

Bias-cut fabrics which have previously been coated and impregnated with an uncured, tacky, elastomeric compound such as a synthetic elastomer have conventionally been used in the production of power transmission belts, hoses, and the like as a protective cover and reinforcement. It is the common practice to combine the pre-coated bias-cut fabric with the carcass, substrate or core of the product during the vulcanizing operation such that heating cures and adhesively bonds the fabric to the rubber base of the product.

Elastomer-coated bias-cut fabrics have been the subject of a number of U.S. Patents including: U.S. Pat. No. 1,323,212 (1919) to Bulley; U.S. Pat. No. 3,784,427 (1974) to Griffin; U.S. Pat. No. 3,832,210 (1974) to Rohlfing; U.S. Pat. No. 4,283,455 (1981) to McGee; as well as the following U.S. Patents to the present inventor: U.S. Pat. No. 4,062,989 (1977) to Long; U.S. Pat. No. 4,116,159 (1978) to Long; U.S. Pat. No. 4,205,559 (1980) to Long et al.

Bulley discloses a rubber impregnated bias cut fabric for use in a tire carcass.

Griffin discloses a method and apparatus for manufacturing an elastomer-coated bias cut fabric wherein a tubular woven fabric is cut spirally at a 45° angle to produce a continuous sheet of fabric which is impregnated with a curable binder and transversely stretched on a tenter frame to increase the complementary angle of the warp and weft threads. The binder is cured or otherwise hardened to stabilize the fabric and is subsequently immersion impregnated with the elastomeric composition such as neoprene dissolved in a solvent, dried and cut into strips for application to V-belt cores.

Rohlfing discloses a bias cut fabric which is manufactured from a tubular fabric which is woven such that when the fabric is cut on the 45° bias there is a minimum of selvage.

McGee discloses a process which parallels that of Griffin wherein the fabric is impregnated with an elastomeric composition containing a pigment which is removed as the edges of the fabric are abraded to reveal the white threads of the fabric which can then be interpretted as a sign of wear.

Long U.S. Pat. No. 4,062,989 discloses a method and apparatus for uniformly coating and impregnating a bias-cut woven fabric with a tacky elastomer as the fabric is pantographed on the tentering frame. The fabric is coated without stabilizing the fabric with additional binder by sequentially applying a viscous elastomeric coating to the lower and upper faces of the fabric inwardly of the edges while the fabric is stretched on a tenter frame and by smoothing the coatings to a uniform thickness.

Long U.S. Pat. No. 4,205,559 is directed to a neoprene coating composition useful in the Long U.S. Pat. No. 4,062,989 process wherein a carboxylated neoprene is tackified with a high boiling aromatic oil.

Long U.S. Pat. No. 4,016,159 is directed to a coating head for applying viscous coatings such as elastomeric latices to a moving woven web. The coating head employs a pair of elongate manifolds extending across the web which simultaneously coat both faces of web by extrusion and thereby ensure penetration of the interstices of the fabric by the coating composition.

SUMMARY OF THE INVENTION

The present invention provides an elastomer-coated bias fabric and, more particularly a neoprene-coated bias-cut fabric reinforcement, wherein only one face of the coated fabric is tacky. The term "bias fabric" as used herein includes plain woven fabric which is cut on the bias (so called bias-cut fabric), bias woven fabric, and non-woven fabric in which the yarns or fiber bundles have a bias orientation.

The coated reinforcement fabric of the present invention comprises a bias fabric which is coated on both faces with uncured elastomer, wherein the uncured elastomeric coating on one face only of the fabric is overcoated with a layer of an uncured carboxylated elastomer incorporating a tackifying agent. In a specific embodiment of the invention, neoprenes and carboxylated neoprenes are used. (The terms "neoprene" and "carobxylated neoprene" as used herein are mutually exclusive as also are the terms "elastomer" and "carboxylated elastomer"). This fabric reinforcement is particularly advantageous because it provides secure positional attachment between the coated fabric and the product base in preparation for vulcanization.

In the manufacture of power transmission belts, a reinforcement fabric is fixed to the rubber base of the belt either by bonding the fabric to one face of the rubber belt body in the case of a raw edge belt or by wrapping the fabric about the belt body in the case of a covered belt and bonding the overlapping pieces of fabric to one another and the fabirc itself to the body of the belt. Difficulties have been encountered maintaining positive secure positional attachment of the precoated reinforcement fabric to the rubber base of the belt and especially to the overlapping portions of the fabric itself when preparing the belt for vulcanization. If secure attachment of the precoated fabric to the base and/or the overlapping portions is not maintained the service life of the belt can be greatly reduced. In particular, if secure attachment is not maintained the fabric may separate from the base due to poor vulcanization bonding at the interface of the fabric and the body of the belt. For this reason, reinforcement fabrics having a highly tacky uncured rubber-coated surface which securely adheres the fabric to the belt body have been used in some belt manufactures.

Several problems arise in providing an elastomer coated fabric having a tacky surface. Tackified latices are generally so unstable that they are not amenable to industrial coating. The presence of the tackifying agent apparently interferes with the maintainance of the micelle such that upon the application of shear forces during coating, the micelle breaks down and the latex agglomerates. Somewhat stable latices can be formed when a tacky polymer is mixed with the elastomer, but the coatings which are produced from these latices do not have a high cured adhesion strength. Relatively stable tackified latices can be prepared from so called carboxylated elastomers, but the carboxyl groups in these elastomers will interact with the surface of a product mold such that reinforcing fabrics prepared in accordance with Long U.S. Pat. No. 4,062,989 that are coated on both faces with a tackified carboxylated elastomer such as a carboxylated neoprene are not suitable because the fabric cures to the mold. While one solution to this problem would appear to be to coat the surface of the fabric facing the mold with a non-tacky, non-carboxylated elastomer, reserving the tacky carboxylated elastomer for the surface adjacent the base of the product, due to differences in the physical properties of standard and carboxylated elastomers and destabilizing interactions between them fabric can not be prepared in that manner. In some cases the different coatings agglomerate during the coating process and in others, the coatings which are obtained do not have good adhesion for each other or the fabric. Furthermore, the coatings tend to not fully penetrate the yarn bundles and the interstices of the fabric. Hence, prior to the present invention, it was not feasible to tackify neoprene-coated bias cut fabrics and use these fabrics as reinforcements in power transmission belts and other vulcanized products.

Hereinafter, the present invention will be described with reference to the production of neoprene-coated bias fabrics, those skilled in the art will understand, however, that the teachings herein are also applicable to forming coated fabrics using such elastomers as styrene butadiene rubber, acrylics, nitriles, polyurethanes, vinyl resins, natural rubber, etc. wherein a tacky surface is provided on one face of the fabric by the application of the corresponding tackified carboxylated, elastomer.

In accordance with the present invention, tackified neoprene-coated fabrics which do not cure to the belt mold during vulcanization are obtained by a coating process wherein a non-carboxylated neoprene latex is applied to both faces of the bias-cut fabric and dried and thereafter a tackified carboxylated neoprene latex is applied over the dried non-carboxylated neoprene on one face only of the fabric. It has been found that by drying the noncarboxylated neoprene latex prior to applying the tackified carboxylated neoprene on the face of the fabric, the undesirable interactions between the coatings can be overcome and a uniform coating of the tacky carboxylated neoprene having good adhesion to the underlying neoprene coating can be provided. In addition, it has also been found that by sandwiching the bias cut fabric between two coatings of non-carboxylated neoprene, good penetration of the interstices and good fabric adhesion is obtained.

Thus, in addition to the aforementioned fabric, the present invention also provides a method for manufacturing an elastomer coated bias fabric wherein one face of the fabric is provided with tacky, uncured carboxylated neoprene which comprises:

(a) pre-impregnating a bias fabric with an elastomeric latex composition, (b) transversely stretching the pre-impegnated fabric in the widthwise direction, (c) applying a flowable elastomeric latex composition to both faces of the stretched fabric such that the elastomeric latex composition substantially penetrates the interstices of the fabric, (d) drying the fabric to solidify the elastomeric composition thereon, (e) applying a flowable tackified, carboxylated elastomeric latex composition over the neoprene coating on one face only of the coated fabric, and (f) drying the fabric to solidify the carboxylated elastomeric composition and provide a tacky coating.

In another embodiment of the present invention, an apparatus for manufacturing reinforcement fabric by the aforementioned process is provided. That apparatus comprises:

means for moving a bias fabric in a generally horizontal path of travel, means for immersing the fabric in an elastomeric composition as it moves along said path of travel, so as to impregnate the fiber bundles in the fabric with the elastomeric composition, means for transversely stretching the fabric and maintaining the fabric in a stretched condition as it moves along said path of travel, a first applicator means positioned beneath and extending across the path of travel for continuously applying a layer of an elastomeric composition to the bottom surface of the fabric as the fabric moves along the path of travel, a second application means positioned above and extending across the path of travel for continuously applying a layer of an elastomeric composition to the top surface of the fabric as it moves along the path of travel, a first scraper means positioned beneath the path of travel and downstream of the first and second applicator means and extending across the path of travel for continuously smoothing the layer of elastomeric composition on the bottom surface of the fabric to the desired thickness and removing excess composition, a first drying means positioned immediately downstream of the first scraper means for drying the coated fabric, a third applicator means positioned beneath and extending across the path of travel for continuously applying a layer of a tackified elastomeric composition to the bottom surface of the fabric as it moves along the path of travel, a second scraper means positioned beneath the path of travel and downstream of the third applicator means for continuously smoothing the layer of elastomeric composition on the bottom surface of said fabric to the desired thickness and removing excess composition, and means for collecting the coated fabric.

BRIEF DESCRIPTION OF THE DRAWINGS

FIG. 1 is a cross-sectional elevational view of one embodiment of the neoprene-coated reinforcement fabric of the present invention.

FIG. 3 is an overhead plan view of the coating and tenter frame portions of the apparatus of FIG. 2.

DESCRIPTION OF THE PREFERRED EMBODIMENTS

Figure 2:
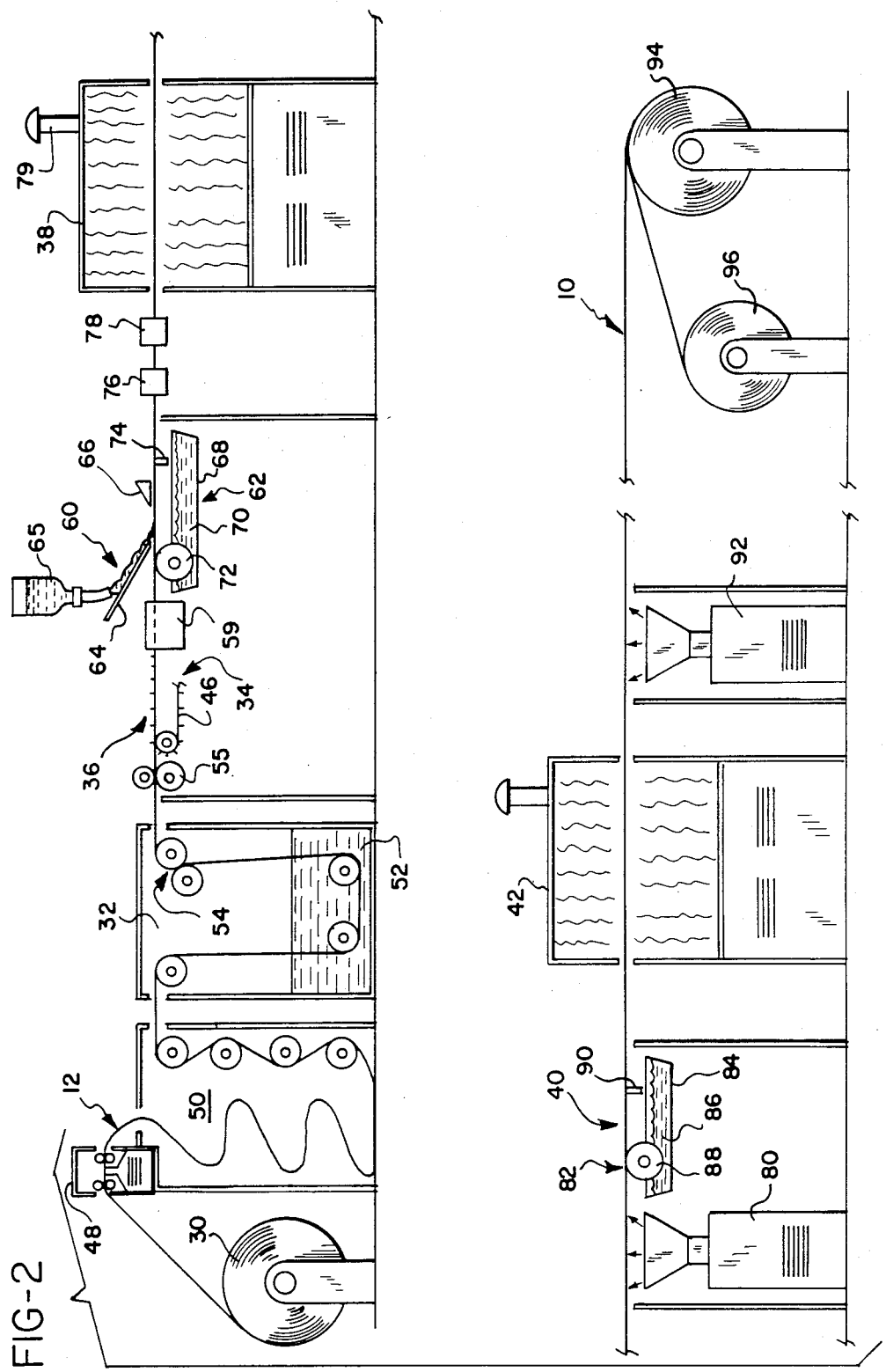
FIG. 2 is a side elevation, diagramatic view of an apparatus for producing reinforcement fabric in accordance with the present invention.

Referring to FIG. 1 the precoated reinforcement fabric of the present invention 10 comprises a bias fabric 12 which is transversely stretched such that the angle between the warp threads 14 and the weft threads 16 is greater than 90°. While FIG. 1 illustrates a woven fabric, it should be understood that non-woven fabrics are also embodiments of the present invention. Preferably, the warp and weft threads or the primary fiber bundle or yarn orientations in the case of non-woven fabrics are at an angle of about 100° to 135° and more preferably 110° to 120°. The upper face 18 and the lower face 20 of the fabric 12 are coated with an elastomeric composition 22. Elastomeric composition 22 is not a carboxylated elastomer. Elastomeric composition 22 penetrates the yarn bundles in the fabric 20. In the embodiment shown in FIG. 1, the elastomeric composition on the lower face 20 of the fabric 12 is overcoated with a layer of a carboxylated and tackified elastomeric composition 24.

The bias fabric 12 may be a bias-cut fabric such as is conventionally used as a reinforcement fabric in the manufacture of power transmission belts, hoses and the like. The fiber content, weight and yarn size as well as the fabric construction can be varied to meet the specific requirements of a particular end use. For example, the fiber content may vary from 100% cotton to 100% polyester with blends therebetween. One often used fabric construction, particularly in belt manufacture, is an 8 ounce, 50% cotton-50% polyester fabric having a 35 by 35 pick construction.

The fabric is most conveniently prepared by cutting a plain woven tubular fabric on a 45° bias. This provides a flat structure of a specific width which depends on the tube circumference on a continuing basis. Although certainly not as convenient, the fabric may also be prepared by bias cutting a plain woven fabric sheet and seaming the panels obtained along the uncut ends in a manner which is also well known.

The elastomeric coated bias-cut fabric of the present invention can be manufactured using the apparatus and method illustrated in FIGS. 2 and 3.

Referring more particularly to FIG. 2 of the drawings, an indefinite length sheet of bias-cut woven fabric is continuously supplied for treatment from a supply source, such as a roll 30. The bias-cut fabric may be provided, in a known conventional manner, by spirally cutting a tubular woven fabric at an angle of approximately 45° to provide a continuous sheet of fabric having warp and weft threads disposed at right angles to each other and at 45° angles to the longitudinal axis of the sheet.

The apparatus as seen in FIG. 2 generally includes a pad 32, a tenter frame 34, an overfeed 55, a first coating station 36, a drying tunnel 38, a second coating station 40 and a drying tunnel 42. The tenter frame 34 is a conventional type well knwon in the art having spaced, moving chains, indicated schematically by dashed lines 44, 46 (FIG. 3), which are provided with pins for supportably engaging the edges of the fabric to transport the fabric through the tenter frame. Sections of chains in the tenter are angularly adjustable to stretch the fabric in widthwise direction during its movement through the tenter.

As the bias-cut fabric 12 moves from supply roll 30 to the pad 32 it may be cleaned using a vacuum 48 and collected on a scray 50 prior to entering the pad.

In pad 32 the fabric 12 is impregnated with elastomeric latex composition as it passes through a elastomeric latex bath 52. This bath is usually formulated from the same elastomer as is applied downstream to the first coating station 36 but has a lower viscosity. Generally, the neoprene composition applied at this stage of the invention process ranges from about 150 to about 350 cps in viscosity. In addition to impregnating the yarn or fiber bundles with latex, the padding process appears to have a two fold effect on the fabric: first, it assists in removing excess warp sizing and, second, the latex composition acts as a lubricant which assists in decrimping the yarn or fiber bundles in the fabric as the fabric is transversely stretched.

As the fabric leaves the dip tank in pad 32 it passes through a mangle 54 where the total wet pickup is reduced. In the invention process, pre-impregnation and reducing the water content effect a number of conditions including the yarn condition, the penetration of the yarn or fiber bundles by the elastomer, the thread angles and orientation, all of which contribute to providing a satisfactory and reproducible product.

The fabric 12 is next overfed in a conventional manner such as by overfeed rolls 55 onto the first section of the tenter frame where the edges of the fabric are supportably engaged by the pins of the traveling chains 44 and 46 of the tenter. The purpose of placing the fabric onto the pins in an overfeed condition is to provide the necessary slack as the fabric is pulled in the transverse direction. The chains in the first section 56 are angularly adjusted about pivot points 58, 59 (FIG. 3) to stretch the fabric in the widthwise direction during its longitudinal movement and thereby increase the angular relationship of the warp and weft threads of the fabric by the desired amount. Typically, in the production of woven fabrics for V-belt construction, the fabrics may be stretched in the first section of the tenter frame to increase the angle between the warp and weft threads or the yarn or fiber bundles from about 90° to approximately 120°. The rate of the overfeed of the fabric and the angular disposition of the tenter chains are coordinated, in a known manner, to impart the desired angular thread relationship to the fabric during stretching. After stretching, the fabric sheet 12 is transported in a stretched condition on the tenter frame in a generally horizontal path through the first coating station 36.

The first coating station 36 comprises a top coater 60 and a bottom coater 62. The top coater 60 comprises a movable chute 64 fed by a latex supply means 65 and a standard doctor blade 66 having on either side thereof and at right angles thereto four inch metal projections which prevent the latex from escaping to the tenter pins. The movable chute 64 is positioned immediately upstream of the doctor blade 66 at a 60° angle to the vertical axis, apexing at the fabric. The purpose of the chute is to minimize the amount of latex on the fabric prior to the doctor blade and thereby provide better control of the latex deposition. Chute 64 is supplied with latex from a conduit. The latex flows down the chute and onto the fabric through an elongate slot formed between the chute 64 and the doctor blade 66.

The bottom coater 62 is located immediately upstream of the top coater 60. To simplify the illustration the bottom coater 62 is shown a distance upstream of top coater 60, however, this distance may be as little as one inch. For that matter, while FIGS. 2 and 3 illustrate a preferred embodiment of the invention, embodiments are envisioned in which the bottom coater is located downstream of the top coater as well as immediately under the top coater for simultaneous coating. As explained below, what is important is that a controlled flood coating of the fabric by the top and bottom coaters is achieved. Furthermore, embodiments are possible in which one of the bottom coater 62 and the top coater 60 is eliminated. In accordance with this modification of the invention, neoprene coating composition applied from one side of the fabric is forced through the fabric to the opposite face where a smooth uniform coating is also formed. Generally, it is more difficult to form smooth uniform coatings by this method.

In FIG. 2, the bottom coater 62 is a roll coater and comprises a trough 68 which is partially filled with coating composition 70 in which a roll 72 rotates under the forward motion of fabric 12. As roller 72 rotates it carries composition from trough 68 and transfers it to the underside of fabric 12. Downstream of roll 72 is a vertically adjustable scraper bar 74 which doctors the bottom coating and returns the excess composition to the trough. In this manner, the apparatus of FIG. 2 provides a so-called controlled flood coat wherein the pre-impregnated and pantographed fabric is under coated, top coated and scraped from the underside all within the dimension of trough 68. This assures that the upper and lower coatings contact through the interstices of the fabric and provides a more intimate bonding of the coatings to the fabric and of the fabric to the product rubber base.

The neoprene coating composition applied at coaters 60 and 62 generally is formulated from the same neoprene latex used in pre-impregnating the fabric and has a viscosity of about 1300 to 2000 cps. The viscosity used will depend on the properties of the coating composition (generally its thixotropy) and the construction of the fabric so as to obtain good penetration of the interstices of the fabric and a smooth and uniform coating.

The amount (dry weight) of elastomeric coating composition applied to the fabric at this stage of the invention process will vary with the fabric construction, e.g., the tightness of the weave and the fabric weight. For a 6 oz. 30×30 fabric the dry coverage for a neoprene composition is about 2.5 oz./sq.yd. On the other hand, for an 8 oz. fabric it is about 3.5 oz./sq.yd. Thus, the coating amount is in part a function of the amount of composition the particular fabric tends to pick up. The coating conditions and amounts are adjusted to obtain a thin uniform coating which fills the interstices of the fabric and just covers the fabric threads whereby good adhesion of the fabric to the product base is obtained.

In FIG. 2 the coated fabric proceeds further into the tenter frame to the second pivot point 76 which is a slightly greater width than at the previous point and from there to a third slightly greater pivot point 78. This assures that the coated fabric is maintained in a tight condition and continues the angular build up in the fabric. Thereafter the fabric passes through a first drying tunnel 38 such as an oven where it is dried. The tunnel is appropriately vented as shown at 79.

Using neoprene latices, drying conditions must be carefully controlled to avoid the formation of a skin having a low vapor transmission rate on the surface of the coating. A suitable drying temperature in tunnel 38 is in the range of about 250° to below 320° F. At temperatures of 320° F. and above the neoprene composition will cross-link. A preferred practice is to steam dry the neoprene coatings.

Upon exiting the drying tunnel 38, the coated fabric 12 passes over an air blower 80 and from there to the second coating station 40. The air blower cools the elastomer coating to a temperature suitable for coating with the carboxylated elastomer. If the coating is not adequately cooled using an air blower or equivalent means, temperature build up in the coating may cause the subsequently coated carboxylated elastomer composition to "skin over" upon contact with the coated fabric and interfere with the formation of a smooth coating.

In the illustrated coating apparatus, the second coating station consists of a bottom coater 82 which may be a roll coater identical or similar to the bottom coater 62 at the first coating station 36. As shown, the bottom coater 82 comprises a trough 84 which is filled with a tackified carboxylated elastomeric latex 86. A roll 88 is driven by travel of the fabric in its horizontal path and carries latex onto the dried elastomeric coating on the underside of the fabric. Downstream of the roll 88 is another vertically adjustable scraper bar 90 which smoothes the coating as previously discussed.

Coating conditions are adjusted at the bottom coater 82 to apply a relatively thin coat of the tackified, carboxylated elastomer which sits up on the surface of the previously coated elastomeric layer without forcing the tackified, carboxylated elastomeric composition into the fabric. Controlling the deposition of the tackified elastomer in this manner, makes the fabric less difficult to handle than if a thick coating of the tackified composition is applied to the fabric and places the composition on the surface of the fabric where it is most effective in adhering the fabric to the rubber base. For this reason the carobxylated latex composition used in the present invention preferably has a relatively high viscosity, for example, in the case of a neoprene latex composition a viscosity on the order of 3000 to 4000 cps is used. In general, a tackified carboxylated neoprene is applied in dry amount of about 1 oz./sq.yd.

While the invention process has been described above with reference to the use of a doctor blade and a roll coater, those skilled in the art will appreciate that equivalent means may be used to apply the respective latices to the top and bottom surfaces of the bias cut fabric. It is improtant, however, that an applicator means be selected which minimizes the amount of shear to which the latex is subjected so as not to destabilize the latex by disrupting the micelle. Furthermore, preferably applicators are used that apply the latices to the fabric without coating the edges of the fabric which come into contact with the tenter pins.

After being coated with the tackified elastomer the fabric passes through a second drying tunnel 42 where the carboxylated elastomer is dried to a tacky state. This operation is not as sensitive as the first drying operation and is typically conducted at temperatures on the order of 225° to 275° F. The fabric passes from drier 42 over air blower 92. As the fabric emerges from the dryer, the uncoated edges are cut from the fabric by suitable cutting means, such as rotating knives (not shown), and the fabric is collected in a batcher or on a simple take off roll 94. To prevent adhesion of the layers of the coated fabric and facilitate handling of the fabric, a sheet of plastic film such as polyethylene, is supplied from a roll 96 to separate the fabric layers. In this regard, blower 92 is used to cool the coated fabric to a temperature sufficiently below the melt point of the polyethylene that the polyethylene can be readily removed from the fabric upon its end use.

The latex compositions used in the present invention may be formulated from commercially available latices and contain appropriate amounts of additional components employed in elastomeric adhesive systems such as cross-linking agents, emulsification aids, antioxidants, catalysts, thickeners, lubricants, fillers and the like depending on the coating properties desired and the particular end use. A commercially avialable neoprene latex from which it is convenient to formulate a neoprene latex composition for use in the present invention is DuPont Latex 735 A (E.I. DuPont). This latex contains about 47% solids. In general, the neoprene latex composition used in the present invention is designed to provide a medium cure rate and to provide a uniform coating which penetrates the yarn bundles and fills the interstices of the fabric. The neoprene latex composition used in the pre-impregnation step of the invention process is designed to impregnate the thread, yarn, or fiber bundles and is a relatively low viscosity composition in comparison to the compositions which are subsequently applied to the fabric. In general, the pre-impregnation composition and the composition applied at the first coating station are formulated from the same commercial latex.

The carboxylated neoprenes used in the present invention are copolymers of chloroprene and an ethylenically unsaturated and carboxylated monomer such as methacrylic acid, acrylic acid, etc. In commercial latices this copolymer may be accompanied by polyvinyl alcohol which functions as a colloidal stabilizer. A representative example of a commercial latex that can be used to provide carboxylated neoprene compositions for use in the present invention is DuPont Latex 115 (E.I. DuPont). Again, the carboxylated neoprene composition is formulated for the end use and coating properties desired. Preferably, the composition possesses a relatively high viscosity, such that the coating sits up on the surface of the fabric.

A number of tackifying agents and techniques can be used to tackify the carboxylated neoprene copolymer and elastomer in general. For example, it can be tackified by the addition of a high boiling aromatic oil as disclosed in U.S. Pat. No. 4,205,559. The preferred means of tackifying the copolymer, however, is to add to the copolymer a tacky resin or rosin. Preferred tackifying agents of the latter type are rosins such as Aquatac 8005, a tall oil rosin manufactured by Sylvachem Corp., Panama City, Fla.

In the manufacture of fabrics for reinforcing power transmission belts, it has been found desirable to incorporate polyethylene in the neoprene latex composition as a lubricant to control the frictional coefficient of the belt. The polyethylene used has a relatively low melt index such that as the belt heats up the polyethylene melts and gradually migrates to the surface of the belt where it is able to reduce the coefficient of friction. This is important because if the coefficient of friction becomes too high as the belt is run, the belt will grab the sheave in which it runs and the belt will break upon a sudden start up or stop. By incorporating polyethylene in the fabric coating, the polyethylene will continuously lubricate the surface of the belt. The amount of polyethylene used in the compositions will vary with the frictional properties desired. Polyethylenes having a melt point greater than about 215° F. up to about 285° F. are suitable for use in the present invention.

The invention is illustrated in further detail by the following example of a process for forming neoprene-coated, bias-cut fabric.

EXAMPLE

An 8 oz./sq.yd. tubular woven fabric composed of 50% cotton-50% polyester threads having a 35×35 pick construction was spirally cut on a 45° angle to produce a continuous sheet of woven fabric in which the warp and weft yarns were disposed at 90° to each other. The fabric was fed to a pad tank containing Latex Formulation A below and into the pad.

| Latex Formulation A | |
|---|---|
| | wet parts |
| Latex 735A (48% solids neoprene latex available from E. I. DuPont | 218 |
| KD 4 (Wing-stay-L dispersion, - Goodyear Tire and Rubber Co.) | 4 |
| KD 40 (zinc oxide) | 4 |
| Sulfur | 1 |
| Fabritone PE (Polyethylene, melting point: about 219° F.) | 50 |
| Carbon Black (Monocol 20-72 Mono Chem Corp., Atlanta, Texas)[1] | 50 |

[1] In fabrics for V-belt manufacture, the neoprene latex compositions contain carbon black as an antistatic agent.

The nip pressure was adjusted such that the total wet pick up in the pad did not exceed 80%.

The fabric was thereafter continuously overfed up to 45% onto a tenter frame and stretched in the first zone to produce a thread angle of approximately 120°. The stretched fabric was passed on the tenter frame through the coating apparatus shown at the first coating station in FIGS. 2 and 3 where the following Latex Formulation B was applied to the top and bottom faces.

| Latex Formulation B | |
|---|---|
| | wet parts |
| Latex 735A | 218 |
| Ammonium Stearate (a dispersion aid) | 60 |
| KD 4 | 4 |
| KD 40 | 4 |
| Sulfur | 1 |
| Polyethylene (same as in Latex Formulation A) | 35 |
| Carbon Black (Monocol 20-72) | 85 |

After coating the fabric was dried to a nonflowable state by passing it through an oven set at 290° F. Upon exiting the oven the fabric was cooled to about 200° F. by blowing air over the fabric. The fabric was then coated with the following Latex Formulation C, a tackified, carboxylated neoprene latex, using a roll coater and scraper bar as shown in FIGS. 2 and 3.

| Latex Formulation C | wet parts |
|---|---|
| Water | 50 |
| Melamine-formaldehyde (Cymel 301, American Cyanamide) | 12 |
| Catalyst 40—40 (American Cyanamide) | 2 |
| KD 4 | 2 |
| Sulfur | 1 |
| Aquatac 8005 (a pine residue rosin available from Sylvachem Co. Panama City, Florida) | 90 |
| DuPont Latex 115 (carboxylated neoprene latex from E.I. DuPont) | 120 |
| Carbon Black (Monocol 20-72) | 10 |

This coating was subsequently heated to 250° F. in an oven and dried to a nonflowable tacky state. Upon leaving the oven the uncoated edges of the fabric were removed and the fabric collected with a separation sheet of polyethylene in roll form.

Having described the invention in detail and by reference to preferred embodiments thereof, it will be apparent that modifications and variations are possible without departing from the scope of the appended claims.

What is claimed is:

1. The method for manufacturing elastomer-coated bias fabric having one tacky surface for use as a reinforcement material in power transmission belts and the like which comprises:
   a. pre-impregnating a bias fabric with an elastomeric latex composition,
   b. transversely stretching said pre-impregnated bias fabric,
   c. applying a non-carboxylated and non-tackified elastomeric latex composition to both surfaces of said fabric such that said composition substantially penetrates the interstices of said fabric and provides a coating of substantially uniform thickness,
   d. Drying said coated fabric to solidify said elastomeric composition,
   e. applying to one surface only of said coated fabric a tackified, carboxylated, elastomeric latex composition, and
   f. drying said tackified, carboxylated latex composition, to a solid tacky nonflowable state.

2. The method of claim 1 wherein said tackified, carboxylated, elastomeric latex composition is applied to said coated fabric while said fabric is travelling in a horizontal path and said tackified, carboxylated, elastomeric latex composition is applied to the lower surface of said coated fabric.

3. The method of claim 1 wherein said fabric is transversely stretched on a tenter frame.

4. The method of claim 3 wherein said method further comprises applying a separator sheet to the tacky surface of said fabric.

5. The method of claim 4 wherein said method further comprises removing the longitudinal edges of said fabric and collecting the coated fabric for subsequent use.

6. The method of claim 3 wherein said both faces of said fabric are coated with said elastomeric latex composition while said faces are in a horizontal position and said elastomeric latex composition is applied to the upper face of said fabric by gravitational discharge.

7. The method of claim 5 wherein said elastomeric latex composition is applied to the lower face of said fabric by transfer from a roll coater and smoothing said coating on said lower surface.

8. The method of claim 7 wherein said tackified, carboxylated, elastomeric, latex composition is applied to said fabric while the surfaces of said fabric are horizontal and said tackified, carboxylated, elastomeric latex composition is applied to the lower surface of said coated fabric by transfer from a rollcoater.

9. The method of claim 8 wherein said method further comprises additional transverse stretching of said fabric after applying said elastomeric latex composition to both faces of said fabric in step (c) and prior to said drying in step (d) to maintain said fabric in a tightened condition.

10. The method of claim 3 wherein said fabric is transversely stretched in said step (b) such that the angle between complementary yarns or fiber bundles is about 110° to 120°.

11. The method of claim 1 wherein after pre-impregnating said fabric with said elastomeric latex composition in step (a) said fabric is squeezed to reduce the amount of wet pick-up from said step (a).

12. The method of claim 1 wherein said elastomeric latex composition is a neoprene latex composition and said tackified, latex is a carboxylated elastomeric latex comprising a copolymer of chloroprene and methacrylic acid.

13. The method of claim 12 wherein said bias fabric is a bias cut fabric.

* * * * *